(No Model.)

G. P. MORRILL.
AX AND TOOL HANDLE GUARD.

No. 289,123. Patented Nov. 27, 1883.

WITNESSES
R. B. Fowler.
B. M. McCrohan

INVENTOR
Geo. P. Morrill

UNITED STATES PATENT OFFICE.

GEORGE P. MORRILL, OF CANTERBURY, NEW HAMPSHIRE.

AX AND TOOL HANDLE GUARD.

SPECIFICATION forming part of Letters Patent No. 289,123, dated November 27, 1883.

Application filed September 27, 1883. (No model.)

*To all whom it may concern:*

Be it known that I, GEORGE P. MORRILL, a citizen of the United States, residing at Canterbury, in the county of Merrimac and State of New Hampshire, have invented a new and useful Improvement in Ax and Tool Handle Guards, of which the following is a specification, reference being had to the accompanying drawings, in which—

Figure 1:
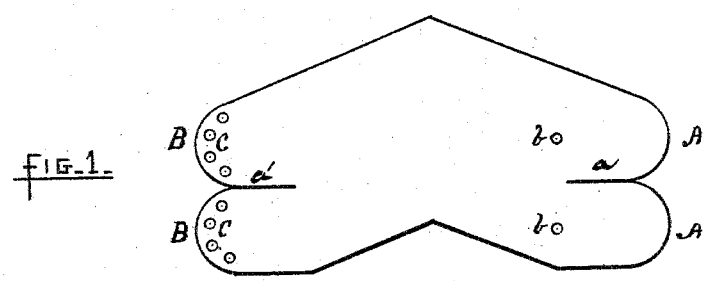
Figure 2:
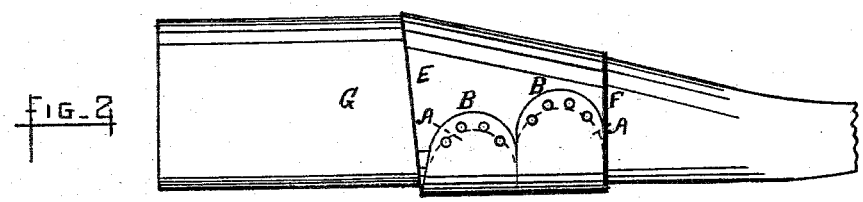
Figure 3:
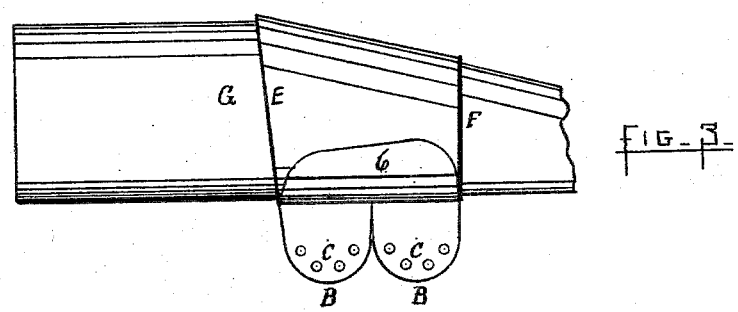
Figure 4:
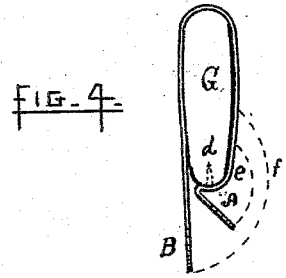

Figure 1 represents the metallic plate forming the guard. Fig. 2 shows a portion of an ax-handle with the guard attached, and Figs. 3 and 4 illustrate the method of attaching the guard to the handle.

Similar letters refer to similar parts in the several views.

My present invention is especially adapted to ax-handles, for the purpose of preventing the handle from splitting where it is cut across the grain, and also for protecting the handle on the under side from blows in cutting and splitting wood, and is a modification and improvement of the guard forming the subject of Letters Patent No. 279,582, granted to me June 19, 1883.

The metallic guard is cut in the shape shown in Fig. 1, with the ends parted at $a$ and $a'$, forming the two tongue-pieces A A and B B. At the base of the tongues A A, I place the holes $b\ b$, and in the ends of the tongue-pieces B B are the holes $c\ c$. The metallic plate is then wound around the tapering portion of the handle G immediately behind the ax. The ends A A are brought beneath the handle and secured thereto by the tacks or nails driven through the holes $b\ b$, one of which is shown by the broken lines at $d$, Fig. 4. The ends A A are then bent back over the heads of the nails $d$, as indicated by the curved dotted line $e$, Fig. 4, and shown in Figs. 2 and 3. The ends B B are then wound around the lower side of the handle, as indicated by the broken line $f$, Fig. 4, and securely fastened to the handle by nails driven through the holes $c\ c$ into the handle. Instead of splitting the end at $a$, forming the ends A A, it may be left entire, as shown at C, Fig. 3, and the opposite end may be left entire, instead of being divided at $a'$ into the tongue-pieces B B, and the guard so formed may be applied in the manner already described, the end B B being folded back over the attaching-nails, and the end A A wound over the end B B, thereby securing three thicknesses of metal over the under side of the ax-handle, where it is most subjected to blows in chopping, and especially in splitting, thereby allowing a thin metallic sheet to be used as a guard, which may be easily bent around the handle. I split the ends, however, at $a$ and $a'$, in order to allow the plate to be wound with the edges E and F drawn closely against the handle, the ends A and B at the edge E being drawn tightly and fastened, and afterward the ends B and A at the edge F are tightly drawn and fastened, causing the plate to fit closely around the tapering form of the handle. The ends B B may be held down by a bolt passing through the handle, if desired, instead of or in addition to the nails in the holes $c\ c$.

I do not claim a metallic band wound about an ax or tool handle for a guard, as that has been long in use; but What I do claim as my invention, and desire to secure by Letters Patent, is—

1. The combination, with an ax or tool handle, of a guard consisting of a metallic band enveloping the handle, the end A A being bent back upon the metallic plate upon the exposed side of the handle, and the end B B wound over the doubled end A A, so as to form three thicknesses of the metallic plate over a portion of the surface of the handle, as and for the purpose set forth.

2. The combination, with an ax or tool handle, of a guard consisting of a metallic band enveloping the handle, and having one end bent back upon itself, and having the opposite end divided at $a'$ into the two parts B B, so as to permit each edge of the band to be drawn closely around the handle, as and for the purpose set forth.

3. The combination, with an ax or tool handle, of a guard consisting of a metallic band enveloping the handle, the two ends of the band being divided at $a$ and $a'$ into two parts, A A and B B, so each side of the band may be fastened independently, enabling the edges to be drawn closely against the handle, the inner ends, A A, being bent back upon the metallic plate, and the ends B B being wound over the same and secured to the handle by nails or other suitable means, as and for the purpose set forth.

GEO. P. MORRILL.

Witnesses:
R. B. FOWLER,
S. B. I. GODDARD.